United States Patent
Lemieux

(10) Patent No.: US 10,285,123 B2
(45) Date of Patent: May 7, 2019

(54) ASSIGNING AN IMS CONTROL FUNCTION INSTANCE TO AN IMS ENDPOINT

(71) Applicant: Telefonaktiebolaget LM Ericsson (publ), Stockholm (SE)

(72) Inventor: Yves Lemieux, Kirkland (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/536,714

(22) PCT Filed: Dec. 19, 2014

(86) PCT No.: PCT/IB2014/067170
§ 371 (c)(1),
(2) Date: Jun. 16, 2017

(87) PCT Pub. No.: WO2016/097828
PCT Pub. Date: Jun. 23, 2016

(65) Prior Publication Data
US 2017/0374614 A1    Dec. 28, 2017

(51) Int. Cl.
*H04W 52/06* (2009.01)
*H04W 52/02* (2009.01)
*H04L 29/06* (2006.01)

(52) U.S. Cl.
CPC ......... *H04W 52/0206* (2013.01); *H04L 29/06* (2013.01); *H04L 65/105* (2013.01); *H04L 65/1016* (2013.01); *Y02D 70/00* (2018.01)

(58) Field of Classification Search
CPC ................................................ H04W 52/0206
USPC ......................................................... 370/311
See application file for complete search history.

(56) References Cited

PUBLICATIONS

Tirana, P. et al., "Distributed Approaches to S-CSCF Selection in an IMS Network", 2010 IEEE Network Operations and Management Symposium, Apr. 19, 2010, pp. 224-231.
Edirisinghe, R. et al., "Cross-Layer Contextual Interaction in Wireless Networks", IEEE Communications Surveys & Tutorials, Apr. 1, 2014, pp. 1114-1134, vol. 16, No. 2.
3rd Generation Partnership Project, "Technical Specification Group Services and System Aspects; IP Multimedia Subsystem (IMS); Stage 2 (Release 13)", 3GPP TS 23.228 V13.0.0, Sep. 2014, pp. 1-311.

(Continued)

*Primary Examiner* — Samina F Choudhry
(74) *Attorney, Agent, or Firm* — Coats & Bennett, PLLC

(57) ABSTRACT

An assignment controller (160) identifies multiple instances of an IMS control function (210, 220) as being candidates for assigning to an IMS endpoint (110). The controller (160) also obtains a performance metric for each candidate instance that is a measure of the extent to which performance requirements for a signaling path of an anticipated or ongoing session of the endpoint (110) would be met if the instance were to be assigned to the endpoint (110). The controller (160) further obtains an emission metric for each candidate instance that is a measure of the extent to which the instance would produce greenhouse gas emissions if the instance were to be assigned to the endpoint (110), given the energy consumption and rate of emissions currently attributable to the instance (110). The controller (160) prioritizes the candidate instances based on these metrics, and controls assignment of one of the instances to the IMS endpoint (110) to be performed according to that prioritization.

31 Claims, 9 Drawing Sheets

(56) References Cited

PUBLICATIONS

Bellavista, P. et al., "An IMS-based Middleware Solution for Energy-Efficient and Cost-Effective Mobile Multimedia Services", 2009 Mobilware, Apr. 29, 2009, pp. 1-19, Berlin, Germany.
Dutta, A. et al., "Self-Organizing IP Multimedia Subsystem", Advances in Next Generation Services and Service Architectures, 2011, pp. 123-147, Chapter 7.

ASSIGNING AN IMS CONTROL FUNCTION INSTANCE TO AN IMS ENDPOINT

TECHNICAL FIELD

The present application generally relates to an Internet Protocol (IP) Multimedia Subsystem (IMS), and specifically relates to assigning IMS control function instances to IMS endpoints.

BACKGROUND

An Internet Protocol (IP) Multimedia Subsystem (IMS) is an IP connectivity and service control architecture that enables various types of media services to be provided to IMS endpoints using common Internet-based protocols. The IMS is access-independent in the sense that it can use access networks of various types to transport media signaling and bearer traffic. Once an IMS endpoint registers with an IMS network so as to inform the IMS network that it is ready to make and receive session requests, it can both initiate and terminate sessions for any type of media service.

The IMS architecture is defined in terms of functional entities (or simply "functions"). Functions constitute applications that are executed by a physical host or server. Different types of functions are logically grouped into separate layers or planes. The IMS media plane includes functions that actually transport and deliver media services so as to handle content traffic. The IMS control plane, by contrast, includes functions that control the media services so as to handle signaling traffic. The control plane for example includes functions that register an IMS endpoint with the IMS network and that control the establishment, maintenance, or tearing down of sessions. Exemplary IMS control functions in this regard include a Proxy Call Session Control Function (P-CSCF), an Interrogating Call Session Control Function (I-CSCF), and a Serving Call Session Control Function (S-CSCF). Other IMS control functions include a media resource function controller (MRFC) and a media gateway controller function (MGCF). See 3GPP TS 23.228 v13.0.0, incorporated by reference herein, for details about these well-known IMS control functions.

An operator of an IMS network may deploy multiple instances of the same IMS control function in the network to realize advantages such as increased signaling capacity, quality of service, and/or redundancy. Deploying multiple instances of the S-CSCF and/or P-CSCF for instance allows the IMS network operator to better handle peaks in the number of media sessions established. When the multiple S-CSCF and/or P-CSCF instances are deployed on hosts geographically distributed throughout the IMS network, the instance deployed on a host that is physically closest to an IMS endpoint will reduce the latency of the signaling path for that IMS endpoint.

Deploying multiple instances of the same IMS control function introduces complexities to the IMS network because the network must dynamically decide which instance to assign to a particular IMS endpoint. Known approaches focus on assigning the instance that will balance the load across the instances and/or their physical hosts, that provides resiliency to instance and/or host failure, and/or that is geographically closest to the IMS endpoint so as to minimize the end-to-end signaling delay. Tirana, P. & Medhi, D. (2010), Distributed approaches to S-CSCF selection in an IMS network., in 'NOMS', IEEE, pp. 224-231. These known approaches, however, fail to account for factors that dictate whether the instance assignment is actually optimal from an environmental perspective.

SUMMARY

One or more embodiments herein assign one of multiple IMS control function instances to an IMS endpoint based on the extent to which those instances would produce greenhouse gas emissions if assigned to the endpoint. The embodiments do so by considering the energy consumption and rate of greenhouse gas emissions that are currently attributable to each instance, given the type of each energy source being used by that instance.

Embodiments for example include a method for governing the assignment of an IP Multimedia Subsystem, IMS, control function instance to an IMS endpoint. The method includes identifying multiple instances of an IMS control function as being candidates for assigning to the IMS endpoint. The method also involves obtaining a performance metric for each candidate instance. The performance metric for a candidate instance is a measure of the extent to which performance requirements (e.g., delay requirements) for a signaling path of an anticipated or ongoing session of the IMS endpoint would be met if the candidate instance were to be assigned to the IMS endpoint. The method further includes obtaining an emission metric for each candidate instance. The emission metric for a candidate instance is a measure of the extent to which the candidate instance would produce greenhouse gas emissions if the candidate instance were to be assigned to the IMS endpoint, given the energy consumption and rate of greenhouse gas emissions currently attributable to the candidate instance. The consumption and rate are dependent on the type of each energy source (e.g., coal, natural gas, nuclear, hydro-electric, etc.) currently being used by the candidate instance.

With these metrics obtained, the method further includes prioritizing the candidate instances relative to one another based on the performance and emission metrics of each instance. The method in this regard more highly prioritizes candidate instances that would yield higher performance and lower emissions. Having prioritized the candidate instances in this way, the method finally involves controlling assignment of one of the candidate instances to the IMS endpoint to be performed according to this prioritization. By governing instance assignment in this way, the method in at least some embodiments advantageously reduces the overall greenhouse gas emissions of the IMS system, e.g., by reducing emissions on an endpoint-by-endpoint or session-by-session basis.

In some embodiments, the method controls assignment in this way by manipulating endpoint-specific configuration data that governs the assignment to reflect the prioritization. For example, in one embodiment, this involves manipulating the endpoint-specific configuration data as maintained by at least one of a home subscriber server, HSS, a dynamic host configuration protocol, DHCP, server, a domain name server, DNS, and a policy server (such as a Policy and Charging Rules Function, PCRF).

In some embodiments, the method is performed periodically or occasionally in anticipation of the session.

In some embodiments, the assignment is performed during a discovery process (e.g., P-CSCF discovery) in which the IMS endpoint attempts to discover the IMS control function. In this case, the method is performed at least in part before the discovery process. Alternatively or additionally, the assignment is performed during a registration process in which the IMS endpoint registers with an IMS. In this case, method is performed at least in part before the registration process.

In some embodiments, the session is an ongoing session, and two or more of the candidate instances are virtual instances of the IMS control function in a virtualized IMS. In this case, assignment of one of the candidate instances to the IMS endpoint comprises changing the instance assigned to the IMS endpoint from an old virtual instance to a new virtual instance and migrating a state of the old virtual instance to a state of the new virtual instance to preserve service continuity. In one or more of these embodiments, controlling instance assignment involves triggering an IMS management system to perform the assignment (including migration) according to the prioritization.

In some embodiments, obtaining the emission metric for a candidate instance comprises determining the rate of greenhouse gas emissions currently attributable to the candidate instance in accordance with a defined policy. The policy in this regard effectively defines different possible rates attributable to the candidate instance depending on certain conditions. The policy specifies those conditions in terms of at least one of different times of day, different locations of the hardware executing the instance, different types of one or more energy sources used by the candidate instance, different types of media for the session, and, different durations of the session.

In some embodiments, the performance metric for a candidate instance is, at least in part, a measure of the extent to which signaling delay requirements for the signaling path would be met if the candidate instance were to be assigned to the IMS endpoint. The delay requirements in this regard are dependent on a location of the instance relative to the current location of the IMS endpoint.

In some embodiments, the method further comprises obtaining a billing parameter that indicates whether and/or to what extent the IMS endpoint is subscribed to a service providing the prioritized assignment, and determining whether or to what extent to perform the method based on the billing parameter.

In some embodiments, prioritizing is further based on historical data indicating which of the candidate instances have actually been assigned to the same or a different IMS endpoint in the past.

In some embodiments, the IMS control function is either a proxy call session control function, P-CSCF, a serving call session control function, S-CSCF, an interrogating proxy session control function, I-CSCF, a media resource function controller, MRFC, or a media gateway controller function, MGCF.

In some embodiments, the IMS control function is a first IMS control function and the method further comprises identifying multiple instances of a second IMS control function as being candidates for assigning to the IMS endpoint in combination with the first IMS control function. In this case, the method includes obtaining a performance metric for each combination of candidate instances of the first and second IMS control functions that is a measure of the extent to which performance requirements for the signaling path would be met if the candidate instances were to be assigned to the IMS endpoint in combination. The method also includes obtaining an emission metric for each combination of candidate instances of the first and second IMS control functions that is a measure of the extent to which the candidate instances in combination would produce greenhouse gas emissions if the candidate instances were to be assigned to the IMS endpoint in combination, given the energy consumption and rate of greenhouse gas emissions currently attributable to that combination. The consumption and rate in this case are a combination of the respective rates currently attributable to the candidate instances individually. The method further entails prioritizing combinations of candidate instances of the first and second IMS control functions relative to one another based on the performance and emission metrics of each combination. Finally, the method involves controlling assignment of one of the combinations to the IMS endpoint to be performed according to the prioritization. In one or more of these embodiments, the first IMS control function is a serving call session control function, S-CSCF, and the second IMS control function is either a proxy call session control function, P-CSCF, a media resource function controller, MRFC, or a media gateway controller function, MGCF.

Embodiments herein also include an assignment controller configured to perform the method(s) described above. In some embodiments, the assignment controller includes functional means or units for doing so. In one such embodiment, the assignment controller comprises one or more processing circuits configured to implement those functional means or units, e.g., as dedicated circuits or with one or more microprocessors in conjunction with memory.

In some embodiments, the assignment controller is distributed over multiple IMS domains.

In some embodiments, the assignment controller comprises (i) a management interface configured to receive a provisioning request from an IMS management system for provisioning a service for the prioritized assignment; (ii) a session initiation protocol, SIP, interface configured to communicate with one or more serving call session control functions, S-CSCFs; and (iii) a Diameter interface configured to communicate with a home subscriber server, HSS.

Embodiments herein also include a computer program comprising instructions which, when executed by at least one processor of an assignment controller, cause the assignment controller to carry out the method(s) above. Embodiments further include a carrier containing such a computer program, e.g., in the form of an electronic signal, an optical signal, a radio signal, or a computer readable storage medium.

DETAILED DESCRIPTION

Figure 1:
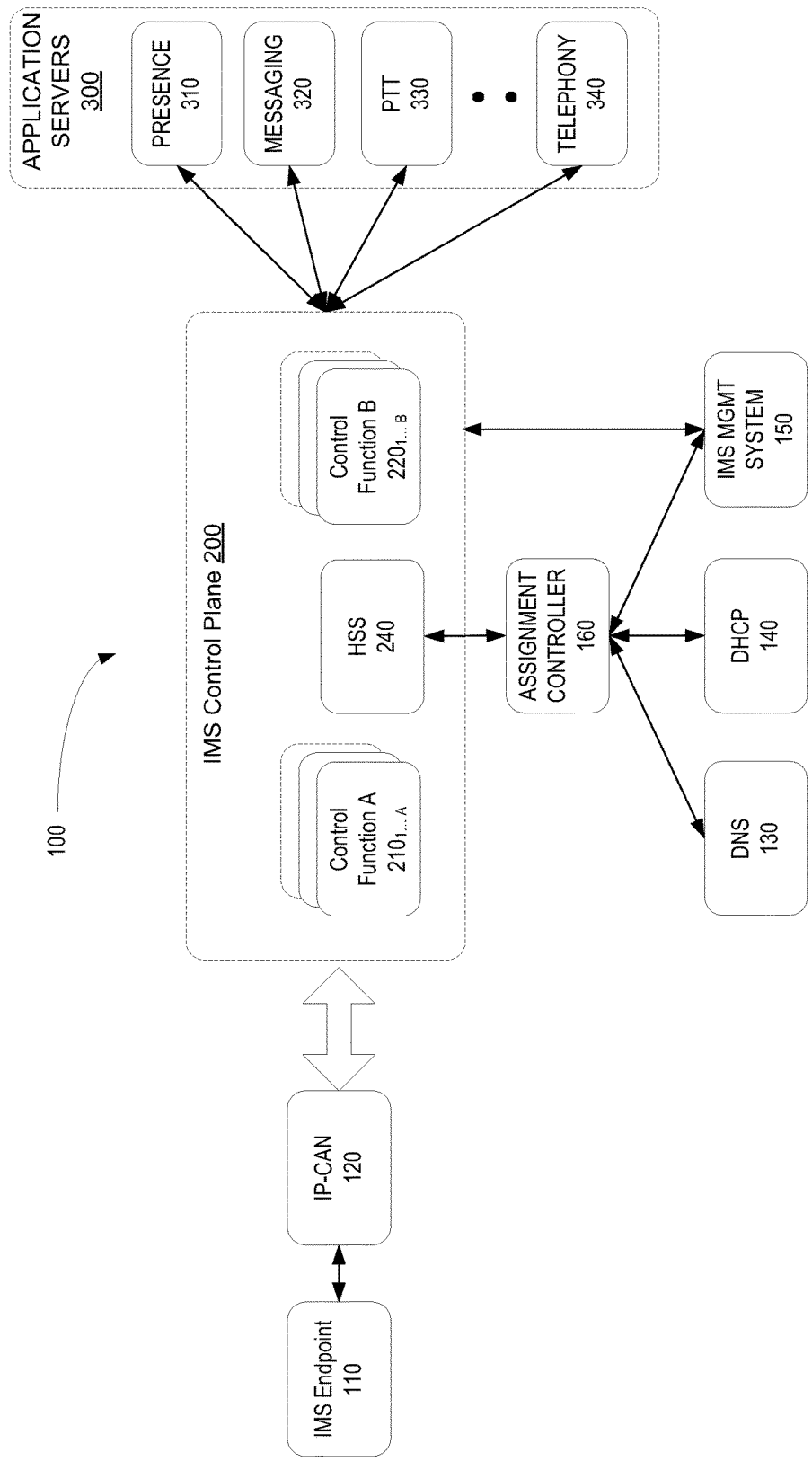
FIG. 1 is a block diagram of an IP multimedia subsystem (IMS) system that includes an assignment controller according to one or more embodiments.

FIG. 1 illustrates an IP multimedia subsystem (IMS) system 100 according to one or more embodiments. The system 100 may consist of one or more IMS networks (i.e., domains) operated by one or more IMS network operators. As shown, an IMS endpoint 110 accesses an IMS control plane 200 via an IP-connectivity access network (IP-CAN) 120. The IMS control plane 200 enables the IMS endpoint 110 to use media services built upon Internet applications, services, and protocols that are provided by various application servers 300, e.g., a presence server 310, a messaging server 320, a push to talk (PTT) server 330, and a telephony server 340.

The IMS control plane 200 in this regard includes various functions that control the media services enabled by the application servers 300. The IMS control plane 200 for example includes functions that register the IMS endpoint 110 with one of the IMS networks in the IMS system 100, namely the endpoint's home network. The IMS control plane 200 also includes function that control the establishment, maintenance, or tearing down of sessions, such as Session Initiation Protocol (SIP) sessions. Exemplary IMS control functions in this regard include a Proxy Call Session Control Function (P-CSCF), an Interrogating Call Session Control Function (I-CSCF), and a Serving Call Session Control Function (S-CSCF). Other IMS control functions include a media resource function controller (MRFC) and a media gateway controller function (MGCF). The IMS control plane 200 may span one or more IMS networks.

One of the IMS networks in the IMS system 100 shown deploys multiple instances $210_1 \ldots 210_A$ of an IMS control function A. Where IMS control function A is a P-CSCF, MRFC, or MGCF, the function may be located in the endpoint's home IMS network or in a visited IMS network. Where IMS control function A is a S-CSCF or I-CSCF, the function may be located in the endpoint's visited IMS network. Any given instance $210_1 \ldots 210_A$ of IMS control function A may be physical in the sense that it is "pre-packaged" in the hardware of a dedicated physical host (i.e., server). Alternatively, any given instance $210_1 \ldots 210_A$ may be virtual in that it is abstracted from hardware and run as software on a virtual machine executed by any physical host. Some or all of the IMS control function's instances $210_1 \ldots 210_A$ may be co-located on the same physical host or may be geographically distributed throughout the IMS network that deploys function A.

Irrespective of the physical or virtual nature of the IMS control function's instances $210_1 \ldots 210_A$, the IMS endpoint 110 is assigned one of those instances. An assignment controller 160 in this regard governs the assignment of an IMS control function instance to the IMS endpoint 110 according to the processing 400 shown in FIG. 2.

Figure 2:
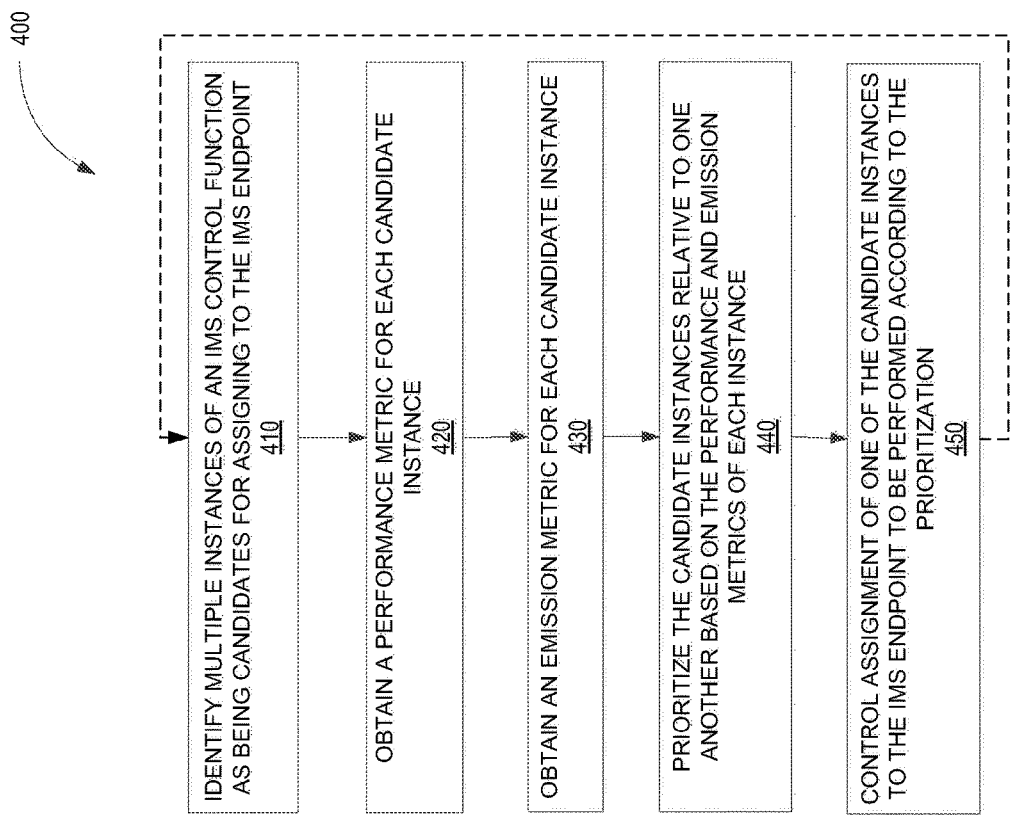
FIG. 2 is a logic flow diagram of a method for governing the assignment of an IMS control function instance to an IMS endpoint according to one or more embodiments.

As shown in FIG. 2, processing 400 at the assignment controller 160 includes identifying multiple instances $210_1 \ldots 210_A$ of an IMS control function as being candidates for assigning to the IMS endpoint 110 (Block 410). Processing 400 further involves obtaining a performance metric for each candidate instance $210_1 \ldots 210_A$ (Block 420). The performance metric for a candidate instance $210_1 \ldots 210_A$ is a measure of the extent to which performance requirements (e.g., delay requirements) for a signaling path of an anticipated or ongoing session of the IMS endpoint 110 would be met if the candidate instance were to be assigned to the IMS endpoint 110.

Processing 400 also entails obtaining an emission metric for each candidate instance $210_1 \ldots 210_A$ (Block 430). The emission metric for a candidate instance $210_1 \ldots 210_A$ is a measure of the extent to which the candidate instance would produce greenhouse gas emissions if the candidate instance were to be assigned to the IMS endpoint 110, given the energy consumption and rate of greenhouse gas emissions currently attributable to the candidate instance. The consumption and rate are dependent on the type of each energy source (e.g., coal, natural gas, nuclear, hydro-electric, etc.) currently being used by the candidate instance.

Processing 400 at the assignment controller 160 further includes prioritizing the candidate instances $210_1 \ldots 210_A$ relative to one another based on the performance and emission metrics of each instance (Block 440). The assignment controller 160 in this regard more highly prioritizes candidate instances that would yield higher performance and lower emissions. Having prioritized the candidate instances $210_1 \ldots 210_A$ in this way, processing 400 finally involves controlling assignment of one of the candidate instances to the IMS endpoint 110 to be performed according to this prioritization (Block 450).

By governing instance assignment in this way, the assignment controller 160 in at least some embodiments advantageously reduces the overall greenhouse gas emissions of the IMS system 100, e.g., by reducing emissions on an endpoint-by-endpoint or session-by-session basis. This is not something that a pure load balancing approach could accomplish. Indeed, a pure load balancing approach would just tend to equally distribute energy consumption across physical hosts, without accounting for the type(s) of energy source(s) (e.g., the electric grid-mix) implicated in doing so. As compared to a pure load balancing approach, then, the assignment controller 160 in at least some embodiments tends to preferentially load physical hosts that are currently using emission-light energy sources (e.g., wind, hydroelectricity, and nuclear), as distinguished from emission-heavy energy sources (e.g., coal and natural gas). The assignment controller 160 of course balances this preference for loading emission-light physical hosts against meeting performance requirements.

In at least some embodiments, the emission metric for a candidate instance is real-time in the sense that it is based on the actual or estimated amount of energy that the instance is consuming and the actual or estimated rate at which the instance is producing emissions when the assignment controller 160 is performing the prioritization. Similarly, the performance metric in some embodiments is real-time in the sense that it is based on the actual or estimated degree to which the candidate instance is currently able (e.g., in terms of available processing resources) to meet signaling path performance requirements. Of course, the real-time nature of the performance metric and/or emission metric may nonetheless be qualified by practical constraints on how often the metrics can and/or need to be updated at the assignment controller 160. In one or more embodiments, therefore, an instance's performance metric and/or emission metric are deemed "current" according to a defined time resolution at which the assignment controller 160 dynamically updates the metric(s). In one embodiment, for example, the assignment controller 160 updates the performance metric and/or emission metric for a candidate instance occasionally or periodically according to a defined time resolution (e.g., every hour). In at least some embodiments, this means that the processing 400 in FIG. 2 is performed periodically or occasionally using performance metrics and/or emission metrics that have been updated since a previous time that the method was performed.

In one or more embodiments, the assignment controller 160 obtains the performance metrics and/or emission metrics for one or more of the candidate instances $210_1 \ldots 210_A$ by receiving those metrics from another node, such as an IMS management system 150.

Alternatively or additionally, the assignment controller 160 obtains the performance metrics and/or emission metrics for one or more of the candidate instances $210_1 \ldots 210_A$ by calculating or otherwise determining (e.g., with a look-up table) those metrics itself.

In one embodiment, for example, the assignment controller 160 determines a number of parameters including (i) the amount of energy that a candidate instance is currently consuming from each of one or more types of energy sources; and (ii) the rate at which those types of energy sources are currently emitting greenhouse gases. In some embodiments, the assignment controller 160 determines these parameters by receiving one or more of them from another node, such as the IMS management system 150. Regardless, the assignment controller 160 then uses those parameters to calculate the emission metric for the candidate instance as being the total amount of emissions that the instance would produce if the instance were to be immediately assigned to the IMS endpoint 110 for an assumed duration (e.g., the next hour). The controller 160 may for instance determine what additional real-time energy the candidate instance would have to consume (above and beyond the instance's current energy consumption) if it were to be assigned to the IMS endpoint 110, and then use the determined energy consumption amount(s) and emission rate(s) to calculate the total emissions that would result over the course of the assumed duration. The total amount of greenhouse gas emissions in this regard may be specified in any appropriate units. In embodiments where the total emissions are specified in kilograms of carbon dioxide equivalency, Kg $CO_2$e, the assignment controller 160 may calculate the total emissions produced by a particular candidate instance as:

$$CO_2 e_{TOTAL} = \sum_i P_i(t, \Delta t) \cdot R_i(t, \Delta t) \qquad (1.1)$$

for each of i types of energy sources used by the instance, where $P_i(t,\Delta t)$ is the estimated or measured amount of energy in Kilowatt hours (KWh) that the instance will consume from energy source type i during an assumed duration $\Delta t$ (e.g., 1 hour) starting from time t, and $R_i(t,\Delta t)$ is the estimated rate (in Kg $CO_2$e per KWh) at which the instance will produce greenhouse gas emissions when consuming energy from energy source type i during the assumed duration $\Delta t$ starting from time t. The estimated or measured amount of energy consumed $P_i(t,\Delta t)$ by a particular candidate instance may be the entire amount of energy consumed by the instance's physical host if the host only executes that one instance, or may be only a portion of the energy consumed by the instance's physical host if the host executes more than one instance and/or more than one IMS control function. Exemplary emission rates $R_i(t,\Delta t)$ for different types of energy sources include 0.012 Kg $CO_2$e per KWh for wind-based energy sources, 0.013 Kg $CO_2$e per KWh for hydroelectricity-based energy sources, 0.014 Kg $CO_2$e per KWh for nuclear-based energy sources, 0.693 Kg $CO_2$e per KWh for natural-gas-based energy sources, and 1.150 Kg $CO_2$e per KWh for coal-based energy sources.

Note, though, that the performance metrics, emission metrics, energy consumption, and/or emission rate may be specified in any form or units that directly or indirectly indicate their respective measures. Rather than being directly specified in terms of Kg $CO_2$e per KWh, for example, an emission rate may be specified in terms of an index that is mapped to a particular Kg $CO_2$e per KWh value or range of values. Furthermore, all instances deployed on hosts at the same data center may be deemed to have the same emission rate, based on the assumption that all hosts use the same energy sources. Alternatively, the emission rate may be specified on a host-by-host basis to allow different hosts within the same data center to use different energy source mixes.

Regardless, in some embodiments, the assignment controller 160 determines the rate of greenhouse gas emissions currently attributable to a candidate instance directly as a function of the time of day, e.g., with the instance associated with different emission rates at different times of day, depending on the different type(s) of energy source(s) used at different times of day. In other embodiments, though, the assignment controller 160 determines the rate of greenhouse gas emissions currently attributable to a candidate instance directly as a function of one or more other parameters. In general, then, the assignment controller 160 makes this determination in accordance with a defined policy. The policy effectively defines possible rates attributable to the candidate instance depending on certain conditions. The policy specifies these conditions in terms of (i) different times of day; (ii) different locations of the hardware executing the instance; (iii) different types of one or more energy sources used by the instance; (iv) different types of media for the session (e.g., video vs. only audio); and/or (v) different durations of the session. Depending on what services are subscribed to, a different policy may apply (e.g., as to what video coder a subscriber may be allowed to use that requires less resources at certain times of the day).

Accordingly, in certain embodiments, the location of the hardware executing a candidate instance affects both the emission metric and the performance metric for that instance. In particular, the location of the physical host executing the instance affects the emission metric, at least indirectly, because different locations are inherently tied to different types of energy sources. And the location of the physical host executing the instance affects the performance metric because different locations are positioned at different distances from the IMS endpoint 110 and are thereby associated with different signaling latencies. In one or more embodiments, therefore, the performance metric for a candidate instance is, at least in part, a measure of the extent to which signaling delay requirements for the signaling path would be met if the candidate instance were to be assigned to the IMS endpoint 110. These delay requirements are dependent on a location of the instance relative to the current location of the IMS endpoint 110. In these and other embodiments, therefore, the assignment of an instance to an IMS endpoint 110 is particularized for that particular endpoint 110 because it accounts for the location of that particular endpoint 110.

As one simple example in this regard, the assignment controller 160 may prioritize a first candidate instance above a second candidate instance if the first instance produces less greenhouse gas emissions than the second instance. The controller 160 may do so even if the first candidate instance cannot meet the signaling path's delay requirements as well as the second candidate instance (due to for instance the first instance not being as physically close to the IMS endpoint 110), e.g., as long as the first candidate instance can come within at least a certain threshold (e.g., 0.5 ms) of those requirements.

In one or more other embodiments, the assignment controller 160 prioritizes the candidate instances also based on historical data indicating which of the candidate instances have actually been assigned to the same or a different IMS endpoint 110 in the past. If, for example, the same candidate instance has historically been assigned to a particular IMS endpoint 110 between the hours of 9 PM and 3 AM, that candidate instance may be prioritized higher between those hours. This scenario may occur in practice if for instance the IMS endpoint 110 remains stationary at a fixed location between 9 PM and 3 AM, suggesting that the historically chosen candidate instance's performance and emission metrics will likely continue to have their historical values between 9 PM and 3 AM for that endpoint 110 (assuming that the candidate instance continues to be executed by hardware at the same location). This is the case in light of the metrics' dependency on the locations of the candidate instance's hardware and the IMS endpoint 110.

In at least some embodiments, the IMS system 100 monetizes emission-prioritized assignment of candidate instances by offering it as a service that an IMS endpoint 110 must pay for, i.e., "green-IMS as a service". In one embodiment, for example, the assignment controller 160 obtains a billing parameter that indicates whether the IMS endpoint 110 is subscribed to a service providing emission-prioritized assignment of candidate instances. The controller 160 then determines whether to perform the processing 400 in FIG. 2 based on the billing parameter. That is, the controller 160 determines to perform processing 400 if the IMS endpoint 110 has subscribed to and/or paid for the prioritization service.

Alternatively or additionally, the billing parameter indicates to what extent the IMS endpoint 110 is subscribed to the prioritization service. For example, different subscription levels (e.g., bronze, silver, gold) to the service provide different levels of prioritization, with higher subscription levels entitling an IMS endpoint 110 to prioritization that produces lower emissions. The differentiation may be realized through different prioritization algorithms that prioritize candidate instances for lower emissions to different extents and/or through conflict resolution algorithms that prioritize higher subscriptions above lower subscriptions when the subscriptions are competing for the same instance of the IMS control function.

Irrespective of how the candidate instances are prioritized, though, the assignment controller 160 in at least some embodiments performs step 450 in FIG. 2 by manipulating endpoint-specific configuration data that governs the assignment so that the configuration data reflects the prioritization. In doing so, the assignment controller 160 influences the way that some other node uses the configuration data to actually assign an instance to the specific IMS endpoint 110.

In one embodiment, for example, the controller 160 manipulates endpoint-specific configuration data that is maintained by a home subscriber server (HSS) 240 shown in FIG. 1. The configuration data in this case may be included in the HSS record for a particular IMS endpoint 110, where that HSS record contains endpoint-specific data needed by the IMS system 100 to deliver services to the endpoint 110.

Consider a simple example where the controller 160 controls assignment of an S-CSCF instance to the IMS endpoint 110 (i.e., IMS control function A is an S-CSCF). In this case, the HSS 240 stores a list of one or more S-CSCF instances that are candidates for assigning to the specific IMS endpoint 110. The controller 160 prioritizes this list of one or more one or more candidate instances using the processing 400 in FIG. 2 to account for greenhouse gas emissions. The controller 160 may for instance provide the HSS 240 with tags of priority in a list of S-CSCF instances, so as to populate the list for the HSS 240. In some embodiments, the controller 160 does so before the registration process during which the IMS endpoint 110 registers with one of the IMS networks in the IMS system 100, namely its home IMS network. This way, when the home I-CSCF assigns the IMS endpoint 110 an S-CSCF instance during the registration process based on the list of one or more one or more S-CSCF candidate instances in the HSS, the list will have already been prioritized to account for greenhouse gas emissions. In other embodiments, by contrast, the controller 160 manipulates endpoint-specific configuration data that is maintained by a domain name server (DNS) 130 and/or a dynamic host configuration protocol (DHCP) server 140 as shown in FIG. 1. The configuration data in this case may be included in the DNS and/or DHCP record for a particular IMS endpoint 110, where that record contains endpoint-specific data needed by the DNS and/or DHCP server for returning a fully qualified domain name (FQDN) and/or IP address to the endpoint 110.

Consider an example where the controller 160 controls assignment of an P-CSCF instance to the IMS endpoint 110 during a P-CSCF discovery process that occurs prior to the IMS endpoint 110 registering with one of the IMS networks in the IMS system 100. During the discovery process, the endpoint 110 attempts to discover a P-CSCF in one of the IMS networks in the IMS system 100, be it a visited network or the endpoint's home network. The IMS endpoint 110 in some embodiments does so by querying the DNS 130 and/or the DHCP server 140. The endpoint 110 may for instance query the DHCP server 140 for an IP address of a P-CSCF instance, where the DHCP server 140 dynamically allocates IP addresses on the fly to new P-CSCF instances without the need for FQDNs. Alternatively, the endpoint 110 may determine (e.g., be pre-configured with) the FQDN of a P-CSCF instance and query the DNS 130 to resolve that FQDN into an IP address of a P-CSCF instance. With this in mind, the controller 160 in some embodiments prioritizes the P-CSCF candidate instances for the IMS endpoint 110 before or in conjunction with the endpoint engaging in P-CSCF discovery. The controller 160 in doing so manipulates endpoint-specific configuration data at the DNS 130 and/or DHCP server 140 to reflect this prioritization. The controller 160 may for instance prioritize a list of one or more IP addresses maintained at the DHCP server 140 and/or at the DNS 130. This way, when the IMS endpoint 110 queries the DNS 130 and/or the DHCP server 140, the IP address of a P-CSCF instance with higher priority (e.g., lower greenhouse gas emissions) will be returned to the endpoint 110. Alternatively, all or part of the prioritized list of P-CSCF IP addresses will be returned to the IMS endpoint 110, which then attempts to use the P-CSCF instances in priority order.

Of course, while the above example discussed manipulating configuration data at the DNS 130 and/or DHCP server 140 for P-CSCF assignment, the controller 160 may alternatively or additionally manipulate configuration data at the HSS 240 or any other node (e.g., a policy server or gateway node outside of the IMS) for such purposes too. For example, configuration data at the HSS 240 may govern instance assignment for any type of IMS control function, be it the P-CSCF, S-CSCF, I-CSCF, MRFC, MGCF, etc. Broadly, therefore, any node and/or procedure may be used for instance assignment according to embodiments herein, as long as the assignment controller 160 directly or indirectly controls that node and/or procedure such that instance assignment occurs according the controller's emission-aware prioritization.

As these examples demonstrate, the assignment controller 160 in at least some embodiments performs all or some of the processing 400 in FIG. 2 in anticipation (i.e., in advance) of the IMS endpoint 110 engaging in a session. As part of this anticipation, the controller 160 may perform all or some of the processing 400 before the IMS endpoint 110 even establishes IP connectivity and/or registers with an IMS network in the IMS system 100. And, as shown as an option in FIG. 2, the processing 400 may be iterative in the sense that the controller 160 performs that processing 400 periodically (e.g., hourly) or occasionally "in the background", as part of this anticipation. This way, when the instance assignment eventually occurs (e.g., as part of establishing IP connectivity and/or as part of IMS registration), the controller 160 ensures that the assignment will be performed based on up-to-date performance and/or emission metrics. In embodiments where an IMS endpoint 110 subscribes to a service providing emission-based prioritization, for example, the controller 160 performs processing 400 periodically (e.g., every hour) from the time when the IMS endpoint 110 subscribes to the service. The IMS endpoint 110 in this case does not even have to be powered on or connected to the IMS system 100 in order for the assignment controller 160 to prepare prioritized instance assignment for the endpoint 110.

In one or more of these embodiments where the controller 160 performs processing 400 in anticipation of a session, the controller 160 controls which instance is assigned to the IMS endpoint 110 at IP connectivity establishment or IMS registration, and that same assignment remains effective for the duration of the IP connectivity or registration, respectively. In one embodiment where the controller 160 controls the assignment of an S-CSCF instance upon the endpoint 110 registering or re-registering with an IMS network, for example, that same S-CSCF instance remains assigned to the endpoint 110 for the duration of any given registration.

In other embodiments, the controller 160 controls instance assignment in such a way that it can be performed at any time, even during an ongoing session. These embodiments prove particularly applicable when two or more of the candidate instances are virtual instances in a virtualized IMS system 100. Indeed, because a virtual instance is abstracted from the hardware of any particular physical host, the virtual instance is able to be migrated from one host to another while still preserving service continuity. In one or more embodiments, therefore, the assignment controller 160 controls instance assignment by directing that the instance assigned to the IMS endpoint be changed from an old virtual instance to a new virtual instance and that the state of the old virtual instance be migrated to a state of the new virtual instance. The assignment controller 160 in at least some embodiments does do by requesting or otherwise triggering the IMS management system 150 to perform the assignment (i.e., migration) according to the controller's prioritization of the candidate instances. This may involve the controller 160 for example identifying the new virtual instance to be assigned to the IMS endpoint 110 as being the highest priority instance and requesting that the IMS management system 150 migrate the state of the virtual instance currently assigned to the endpoint 110 to the new virtual instance. Alternatively, the controller 160 may send the IMS management system 150 a prioritized list of one or more virtual candidate instances and requests that the IMS management system 150 itself select a new virtual instance for the IMS endpoint 110 based on that list. Upon selecting the new virtual instance, the IMS management system 150 migrates the state of the virtual instance currently assigned to the endpoint 110 to the new virtual instance.

Figure 3:
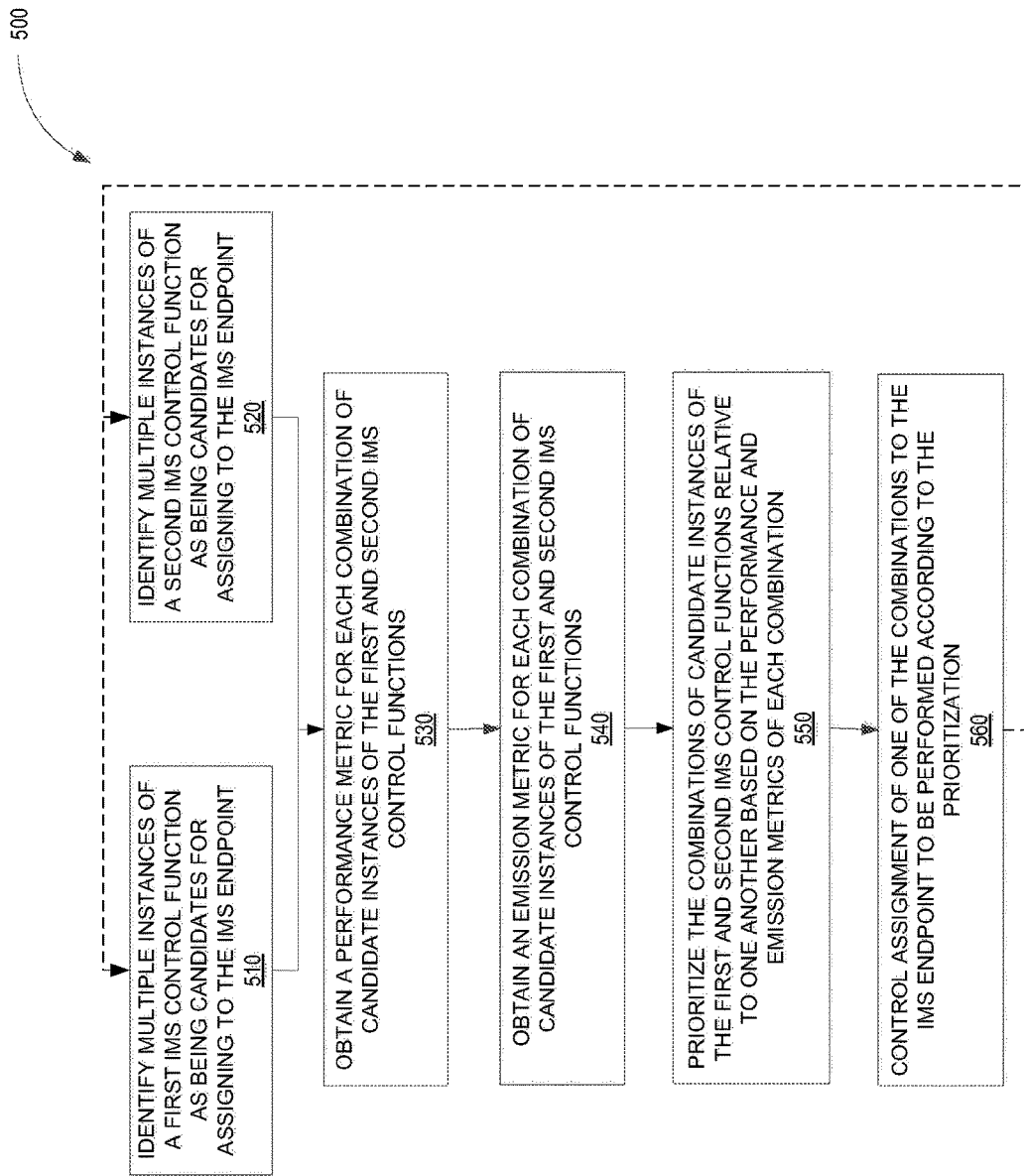
FIG. 3 is a logic flow diagram of a method for governing the assignment of an IMS control function instance to an IMS endpoint in conjunction with the assignment of one or more other IMS control function instances, according to one or more embodiments.

Although the above embodiments have focused on assigning an instance $210_1 \ldots 210_A$ of a single IMS control function A to an IMS endpoint 110, such may actually be performed in conjunction with assigning an instance of one or more other IMS control functions to the endpoint 110. For example, the controller 160 in some embodiments prioritizes candidate instances $210_1 \ldots 210_A$ for IMS control function A in combination with prioritizing candidate instances $220_1 \ldots 220_B$ for another IMS control function B. IMS control function B in this regard may be in the same or a different IMS network than IMS control function A. IMS control function B may be for instance a home or visiting P-CSCF, whereas IMS control function A is a home S-CSCF. In any event, prioritizing candidate instances of multiple IMS control functions in combination may proceed similarly to any of the above embodiments related to prioritizing candidate instances of a single IMS control function, but be based on the combination of multiple IMS control functions rather than on an individual IMS control function. FIG. 3 illustrates processing 500 performed by the assignment controller 160 in one or more of these embodiments.

As shown in FIG. 3, processing 500 at the assignment controller 160 includes not only identifying multiple instances $210_1 \ldots 210_A$ of a first IMS control function (e.g., control function A 210) as being candidates for assigning to the IMS endpoint 110 (Block 510), but also identifying multiple instances $220_1 \ldots 220_B$ of a second IMS control function (e.g., control function B 220) as being candidates for assigning to the IMS endpoint 110 (Block 520) in combination. Processing 500 further includes obtaining a performance metric for each combination of candidate instances of the first and second IMS control functions (Block 530). A performance metric for a combination of candidate instances in this regard is a measure of the extent to which performance requirements for the signaling path would be met if the candidate instances were to be assigned to the IMS endpoint 110 in combination. The assignment controller 160 may itself determine such a performance metric by combining performance metrics for each individual candidate instance in the combination. For example, if the performance metric characterizes latency, the performance metric may be added as a path budget for the session establishment. Similarly, processing 500 also includes obtaining an emission metric for each combination of candidate instances of the first and second IMS control functions (Block 540). An emission metric for a combination of candidate instances is a measure of the extent to which the candidate instances in combination would produce greenhouse gas emissions if the candidate instances were to be assigned to the IMS endpoint in combination, given the energy consumption and rate of greenhouse gas emissions currently attributable to that combination. This energy consumption and emission rate are a combination of the respective rates currently attributable to the candidate instances individually. Processing 500 further entails prioritizing combinations of candidate instances of the first and second IMS control functions relative to one another based on the performance and emission metrics of each combination (Block 550). Such prioritization involves more highly prioritizing (i.e., ranking) combinations that would yield higher performance and lower emissions. Finally, processing 500 includes controlling assignment of one of the combinations to the IMS endpoint 110 to be performed according to the prioritization (Block 560).

The controller 160 in some embodiments controls assignment of one of the combinations to the IMS endpoint 110 by manipulating endpoint-specific configuration data maintained by a single node (e.g., the HSS 240). The controller 160 may for instance prioritize a list of one or more combinations maintained by the single node. In other embodiments, though, the controller 160 manipulates endpoint-specific configuration data maintained by different nodes (e.g., both the HSS 240 and the DNS 130, the DHCP Server 140, or a policy server such as a Policy and Charging Rules Function, PCRF). For example, the controller 160 may manipulate data maintained by one node (e.g., the DNS 130, DHCP Server 140, or a policy server) to control which candidate instance $210_1 \ldots 210_A$ of Control Function A (e.g., P-CSCF) is assigned to the endpoint 110, but manipulate data maintained by a different node (e.g., HSS 240) to control which candidate instance $220_1 \ldots 220_B$ of Control Function B (e.g., S-CSCF) is assigned to the endpoint 110.

As a simple example of this, the controller 160 may control assignment of P-CSCF/S-CSCF instance combinations (i.e., pairs) to the endpoint 110. To do so, the controller 160 may manipulate a list of one or more P-CSCF/S-CSCF instance combinations maintained by the HSS 240 to reflect the controller's emission-aware prioritization of those combinations. Alternatively, the controller 160 may manipulate a list of one or more P-CSCF instances maintained by the DNS 130 or DHCP Server 140, or a policy server, in conjunction with manipulating a list of one or more S-CSCF instances maintained by the HSS 240 so that those two separate lists collectively reflect the controller's emission-aware prioritization of P-CSCF/S-CSCF instance combinations.

Figure 4:
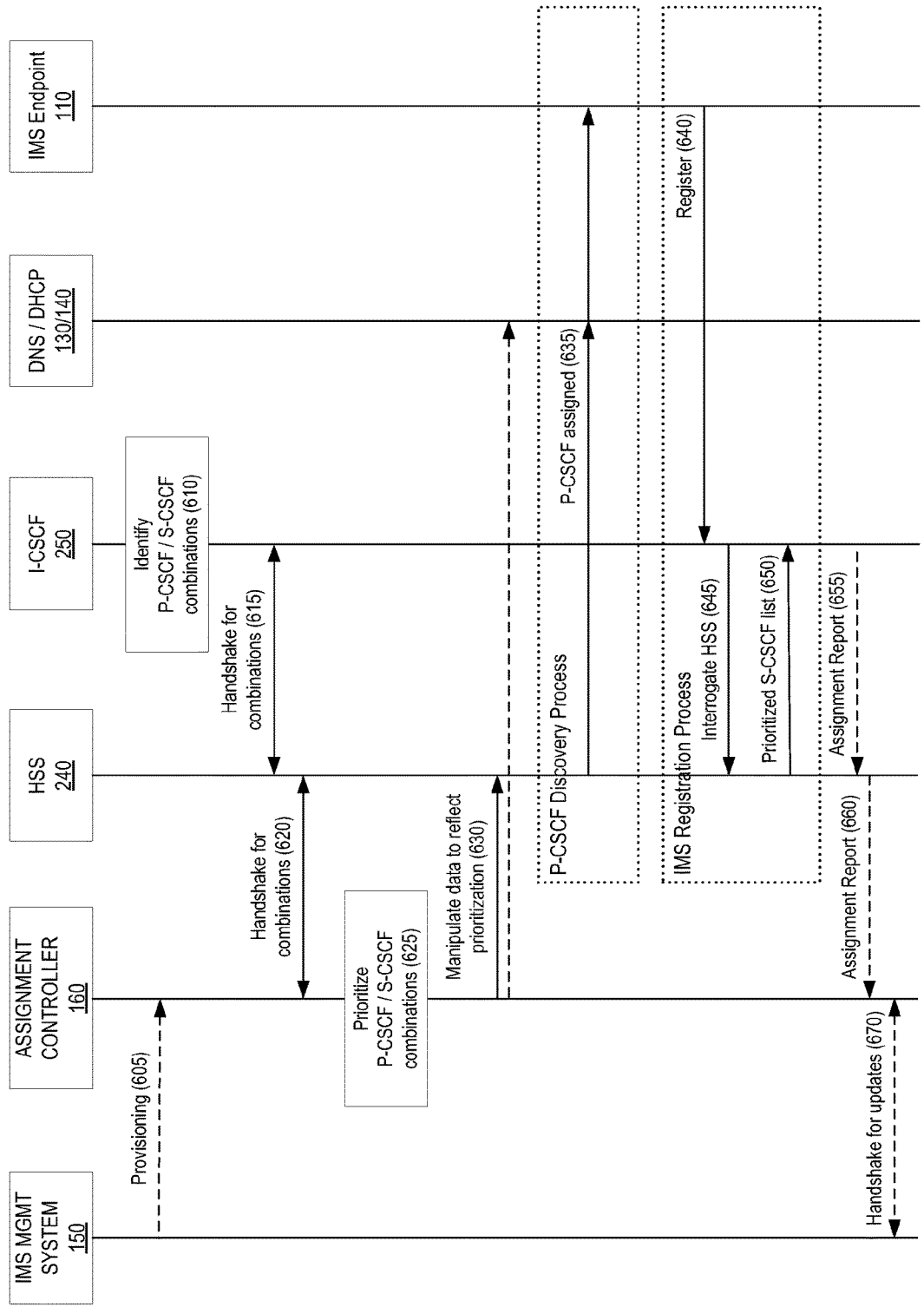
FIG. 4 is a call flow diagram for assigning a P-CSCF instance in the IMS endpoint's home network during the P-CSCF discovery process and a S-CSCF instance in the endpoint's home network during IMS registration, according to one or more embodiments.

FIG. 4 illustrates additional details of this example according to one or more "non-roaming" embodiments where the IMS endpoint 110 is assigned a P-CSCF instance in the endpoint's home network during the P-CSCF discovery process and is assigned a S-CSCF instance in the endpoint's home network during IMS registration. Moreover, in the one or more embodiments illustrated by FIG. 4, the assignment controller 160 performs the processing in FIG. 3 before P-CSCF discovery and IMS registration, in anticipation of the endpoint 110 engaging in the P-CSCF discovery process, IMS registration, and, eventually, a session (as either the originating or terminating endpoint).

As shown in FIG. 4, the IMS management system 150 optionally provisions the assignment controller 160 with information to govern emission-aware P-CSCF/S-CSCF assignment (Step 605). This information may include the performance metrics and/or the emission metrics that the controller 160 employs to prioritize P-CSCF/S-CSCF instance combinations for the endpoint 110, or may include any data, parameters, and/or policies used by the controller 160 to determine some or all of those metrics. The provisioning information may further include a billing parameter that indicates whether and/or to what extent the IMS endpoint 110 is subscribed to a service providing emission-aware, prioritized P-CSCF/S-CSCF assignment.

Meanwhile, an I-CSCF 250 in the IMS endpoint's home network may overseas the overall network (e.g., there may be only one I-CSCF instance in the home network). This I-CSCF 250 identifies different possible combinations of home P-CSCF/S-CSCF instances (Step 610). The I-CSCF 250 handshakes with the HSS 240 in the endpoint's home network to provide the HSS 240 with the identified combinations (Step 615). And finally the assignment controller 160 handshakes with the HSS 240 to itself retrieve the identified combinations (Step 620). This identification and handshaking in some embodiments occurs periodically or occasionally in anticipation of the endpoint 110 engaging in the P-CSCF discovery process, IMS registration, and, eventually, a session. This ensures that the HSS 240 and assignment controller 160 will have up-to-date information about the different possible combinations of home P-CSCF/S-CSCF instances in the home network when prioritization and P-CSCF and S-CSCF instance assignment occurs.

Having identified the different possible P-CSCF/S-CSCF combinations by retrieving them from the HSS 240, the assignment controller 160 prioritizes those combinations relative to one another based on the performance metric and emission metric for each combination, as described with respect to FIG. 3 (Step 625). The assignment controller 160 then controls P-CSCF/S-CSCF assignment that will eventually occur during the P-CSCF discovery process and IMS registration by manipulating end-point specific data that governs that assignment to reflect its prioritization (Step 630). As shown in FIG. 4, this may entail just manipulating a list of one or more P-CSCF/S-CSCF instance combinations maintained by the HSS 240 to reflect the controller's emission-aware prioritization of those combinations. Alternatively, the controller 160 may manipulate a list of one or more P-CSCF instances maintained by the DNS 130 or DHCP Server 140 or a policy server (not shown) in conjunction with manipulating a list of one or more S-CSCF instances maintained by the HSS 240 so that those two separate lists collectively reflect the controller's emission-aware prioritization of P-CSCF/S-CSCF instance combinations.

With emission-aware prioritization of P-CSCF/S-CSCF instance combinations indicated in the HSS 240 and/or DNS/DHCP 130/140, and/or a policy server, P-CSCF/S-CSCF assignment to the IMS endpoint 110 will account for that prioritization when assignment eventually occurs. Indeed, when the IMS endpoint 110 later engages in a P-CSCF discovery process, as shown, the already prioritized P-CSCF instance list at the HSS 240, the DNS/DHCP 130/140, or a policy server (not shown) will govern P-CSCF instance assignment (Step 635). In some embodiments, for example, all or part of the prioritized P-CSCF instance list may be provided to the IMS endpoint 110 by the DNS 130/DHCP 140 or by the HSS 240, e.g., indirectly via an interface, policy server, gateway, etc., whereupon the IMS endpoint 110 attempts to use the P-CSCF instances in priority order. The HSS 240 or the DNS/DHCP 130/140 in this regard may not actually know that the P-CSCF instance list is prioritized to account for greenhouse gas emissions. Similarly, when the IMS endpoint 110 thereafter engages in an IMS registration process, the I-CSCF 250 interrogates the HSS for the prioritized S-CSCF instance list (Step 645) in response to receiving an IMS registration message from the endpoint 110 (Step 640). Having obtained this prioritized S-CSCF instance list (Step 640), the I-CSCF then selects the S-CSCF instance to assign to the endpoint 110 in accordance with that list. Again, the I-CSCF may not actually know that the S-CSCF instance list is prioritized to account for greenhouse gas emissions. In at least some embodiments, once the S-CSCF assignment procedure is performed, the I-CSCF 250 sends to the chosen S-CSCF, the following data string: P-CSCF address/name, Public User Identity, Private User Identity, P-CSCF network identifier, and the IP address of the endpoint 110.

In at least some embodiments, the I-CSCF 250 reports the S-CSCF instance assigned to the IMS endpoint 110 to the HSS 240 (Step 655). And if the DNS/DHCP 130/140 assigned the P-CSCF instance, the P-CSCF instance assigned may also be reported back to the HSS 240. The HSS 240 then reports the P-CSCF/S-CSCF instance combination actually assigned to the endpoint 110 to the assignment controller 160 (Step 660), in order to build a history of actual assignments that can be used to improve emission-aware prioritization. Moreover, in one or more embodiments, the assignment controller 160 also handshakes with the IMS management system 150 for provisioning information updates (Step 670). These updates may include for instance updated performance and/or emission metrics, updated data, parameters, and/or policies used to determine such metrics, or updated S-CSCF/P-CSCF instance combinations that have fewer emissions. The IMS management system 150 may for example dynamically adjusts its sets of policies, data, emission metrics, parameters, and the like as a function of time-of-the-day, day-of-the-week, etc. for the purpose of reducing emissions. Demographics, seasons, demands on the cloud, etc. may change and result in prioritization changes. Accounting for this, control from the IMS management system 150 is dynamic in nature and adjusts to these requirements.

In one or more embodiments, the approach described in FIG. 4 proves advantageous in that it is non-intrusive and does not require modification to the existing message sequence dictated by current IMS standards (e.g., IMS SIP signaling) as described in TS 23-228 Release 12. For example, as described in clause 5.1.1.0 of TS 23-228 Release 12, when the IMS endpoint 110 is aware of more than one P-CSCF address, the P-CSCF instance selection shall be based on home operator configured policy. This policy is specified herein as the endpoint-specific data which the HSS 240 manages and which the assignment controller 240 manipulates to account for greenhouse gas emissions. Similarly, clause 5.1.2.1 of TST 23-228 Release 12 states that when an IMS endpoint 110 attaches and makes itself available for access to IMS services by explicitly registering in the IMS, a S-CSCF instance shall be assigned to serve the IMS endpoint 110. The same clause describes that the assignment of an S-CSCF instance is performed in the I-CSCF 250. Some information is needed in the selection of the S-CSCF instance, including required capabilities for user services (provided by the HSS 240) and operator preferences on a per-user basis (e.g., a predefined S-CSCF instance priority that the assignment controller 160 sets in the HSS 240). Once the S-CSCF instance assignment is completed, the I-CSCF sends to the chosen S-CSCF instance, the following data string: P-CSCF address/name, Public User Identity, Private User Identity, P-CSCF network identifier, IMS endpoint IP address to the selected S-CSCF instance.

Although FIG. 4 illustrated "non-roaming" embodiments where the IMS endpoint 110 is assigned P-CSCF and I-CSCF instances in its home IMS network, the embodiments are readily extendable to "roaming" embodiments wherein the IMS endpoint 110 is assigned a P-CSCF instance in a visited IMS network and assigned an S-CSCF instance in its home IMS network. In at least some of these "roaming" embodiments, different IMS networks implement different instances of the assignment controller 160 and send inter-domain control signaling between themselves to coordinate emission-aware assignment of the visited P-CSCF instance and home S-CSCF instance. Moreover, those skilled in the art will appreciate that FIG. 4 embodiments apply equally to intra-domain or inter-domain sessions, as well as to originating or terminating sessions, of the IMS endpoint 110.

For example, the assignment controller 160, in anticipation of the IMS endpoint 110 terminating a session, may proactively handshake with an S-CSCF instance in a "potentially originating" IMS network. The network is potentially originating in the sense that it may at some point in the future originate a session towards the IMS endpoint 110, but has not yet done so. As part of this handshake process, the assignment controller 160 queries the potentially originating S-CSCF instance for the identity of the I-CSCF instance and therefore HSS in the endpoint's home network that the S-CSCF instance would target for connecting to the IMS endpoint 110, were it to originate a session towards the endpoint 110. Indeed, the potentially originating S-CSCF instance knows from the local application server (AS) what I-CSCF instance in the endpoint's terminating network to use, were it to originate a session towards that endpoint 110. The assignment controller 160 may for example retrieve the identity of I-CSCF and/or the identity of HSS. Correspondingly, the assignment controller 160 handshakes with HSS 240 for different possible P-CSCF/S-CSCF instance combinations as described above to provision the endpoint's HSS 240 for emission-aware assignment. The controller 160 then prioritizes those combinations and manipulates endpoint-specific data managed by the HSS 240 to reflect that prioritization.

Figure 5:
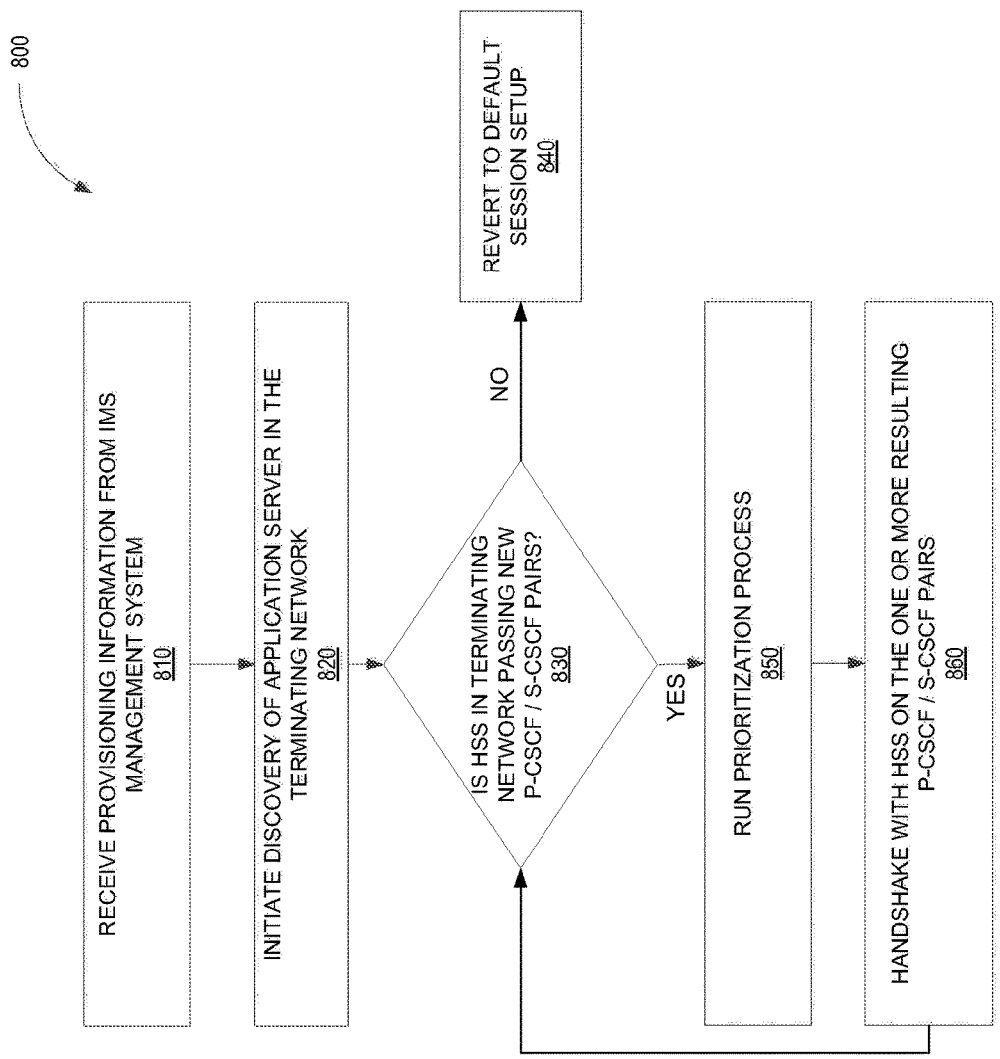
FIG. 5 is a logic flow diagram for an assignment controller to prioritize multiple P-CSCF/S-CSCF instance combinations and to populate an HSS with one or more of the highest priority combinations, according to one or more embodiments.

Although in some embodiments the HSS 240 maintains a list of multiple P-CSCF/S-CSCF instance combinations and the controller 160 prioritizes that list, in other embodiments the controller 160 prioritizes multiple P-CSCF/S-CSCF instance combinations but only populates the HSS 240 with one or more of the highest priority combinations. FIG. 5 illustrates exemplary processing 800 for these latter embodiments in the context of scenarios that involve provisioning from the IMS management system 150 and an inter-domain session.

As shown in FIG. 5, processing 800 at the controller 160 in some embodiments includes receiving provisioning information from the IMS management system, e.g., as described above with respect to FIG. 3 (Block 810). In at least some embodiment, this information describes requirements of an anticipated session in terms of service options (e.g., packet delivery rate or delay requirements). The information may alternatively or additionally describe policies for determining performance and/or emission metrics (e.g., if video, then use broadband connection). Still further, the information may describe billing parameters (e.g., whether the IMS endpoint 110 has subscribed to the emission-aware prioritization service so that the endpoint 110 can be billed accordingly). Regardless, processing 800 further entails initiating discovery of the application server in the terminating network that has media requirements (e.g., bandwidth, latency, available endpoint coding resources, etc.) for a session that the IMS endpoint 110 is anticipated to terminate (Block 820). Processing 800 next involves determining whether the HSS 240 in the terminating network has provided the controller 160 with new prioritized P-CSCF/S-CSCF pairs since a previous update period (Block 830). If not, the controller 160 reverts to a default session setup (Block 840). If so, though, the controller runs its prioritization process with respect to possible P-CSCF/S-CSCF pairs, including the new ones just identified (Block 850). This prioritization process returns one or more P-CSCF/S-CSCF pairs, whereupon the controller 160 handshakes with the HSS 240 to populate the HSS 240 with those resulting pairs (Block 860).

Figure 6:
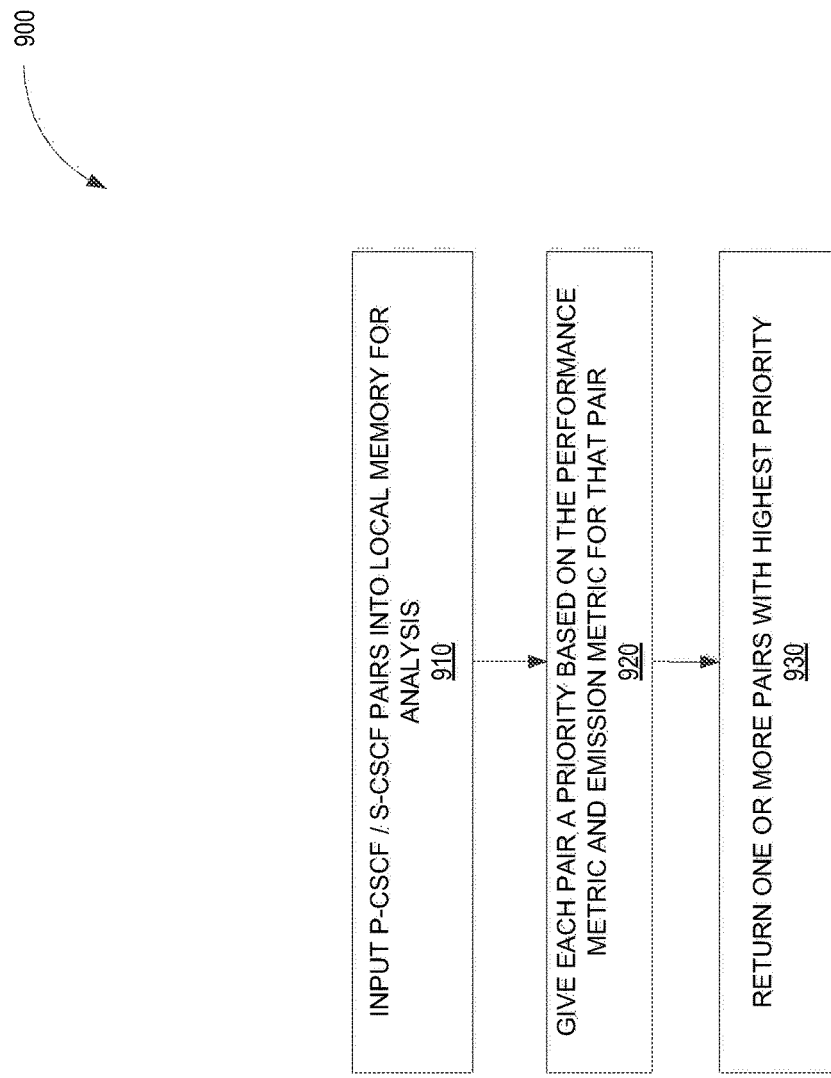
FIG. 6 is a logic flow diagram of prioritization processing according to one or more embodiments.

In more detail, FIG. 6 illustrates the prioritization process according to at least some embodiments. The process 900 includes inputting all available P-CSCF/S-CSCF pairs into the local memory of the assignment controller 160 for analysis (Block 910). The process 900 then entails giving each pair a priority based on the performance metric and emission metric for that pair (Block 920). In one embodiment, this involves first coarsely prioritizing the pairs based on the pairs' respective power consumption (e.g., available as an HSS record), and then more finely prioritizing the pairs based on the pairs' respective rate of greenhouse gas emissions (e.g., as determined based on one or more policies provisioned by the IMS management system 150, such as a mapping of time-of-day to emissions or energy sources). In this case, the now finely prioritized pairs are then checked for compliance with the performance requirements of the anticipated session (e.g., as specified by service options provisioned by the IMS management system 150). If the prioritized pairs meet these performance requirements, the process 900 returns one or more pairs with the highest priority (Block 930).

Figure 7:
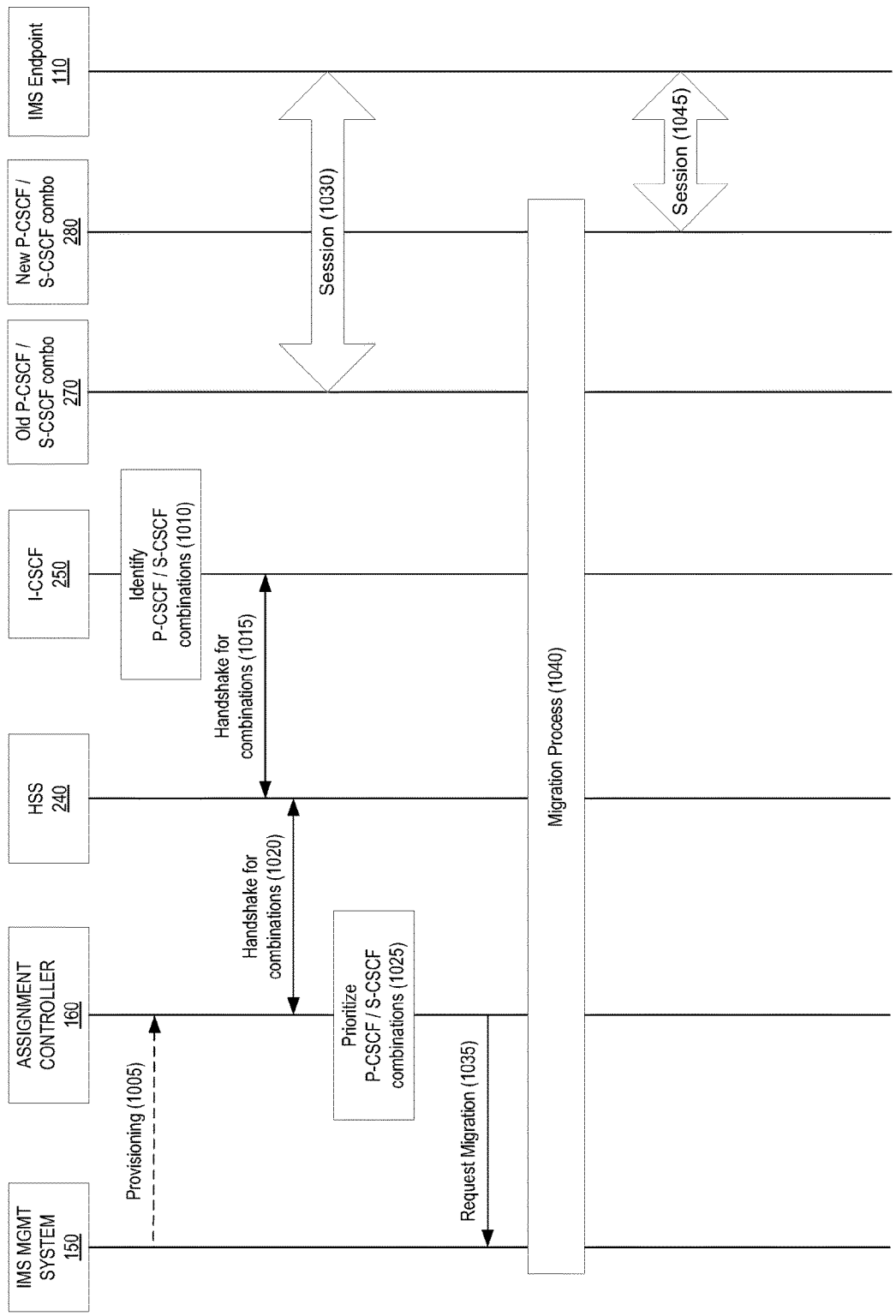
FIG. 7 is a call flow diagram for assigning a virtual P-CSCF/virtual S-CSCF instance pair during an ongoing session, according to one or more embodiments.

FIG. 7 illustrates additional details of some embodiments where the IMS endpoint 110 is assigned a virtual P-CSCF/virtual S-CSCF instance pair during an ongoing session. As shown, the assignment controller 160 prioritizes different virtual P-CSCF/virtual S-CSCF instance pairs (Step 1025) even while the IMS endpoint 110 is engaged in an ongoing session (Step 1030). If the prioritization reveals that the virtual P-CSCF/virtual S-CSCF instance pair 270 currently being used for the ongoing session is no longer the highest priority pair, the assignment controller 160 requests the IMS management system 150 to assign a new virtual P-CSCF/virtual S-CSCF instance pair 280 to the IMS endpoint 110 that has a higher priority (Step 1035). In particular, the controller 160 in some embodiments identifies the new virtual P-CSCF/virtual S-CSCF instance pair 280 as being the highest priority pair and requests that the IMS management system 150 migrate the state of the pair 270 currently assigned to the endpoint 110 to the new pair 280. After performing this migration process (Step 1040), the IMS endpoint 110 continues the ongoing session using the new pair 280 (Step 1045), while maintaining service continuity.

Although FIGS. 4-7 were described with combinations of P-CSCF/S-CSCF instances, the illustrated embodiments are equally applicable to any type and any number of IMS control function instances. Indeed, as yet another example, other embodiments herein control assignment of an S-CSCF instance in combination with a I-CSCF instance, MRFC instance, and/or MGCF instance. Moreover, although mostly exemplified above with both a home P-CSCF and a home S-CSCF, the endpoint 110 in other embodiments may be assigned a visited P-CSCF in combination with a home S-CSCF.

Note that the above embodiments do not require that an IMS control function instance be dedicated to a single IMS endpoint 110. In fact, in at least some embodiments, the assignment controller 160 may assign more than one IMS endpoint to the same (i.e., shared) IMS control function instance. Moreover, the above embodiments do not require that an IMS endpoint 110 be associated with a single user. In one or more embodiments, for example, an IMS endpoint 110 is associated with a tenant operator of a virtualized IMS network deployed on the hardware of another IMS network's operator (i.e., a tenant who is provided IMS-as-a-service in a multi-tenant approach).

Figure 8:
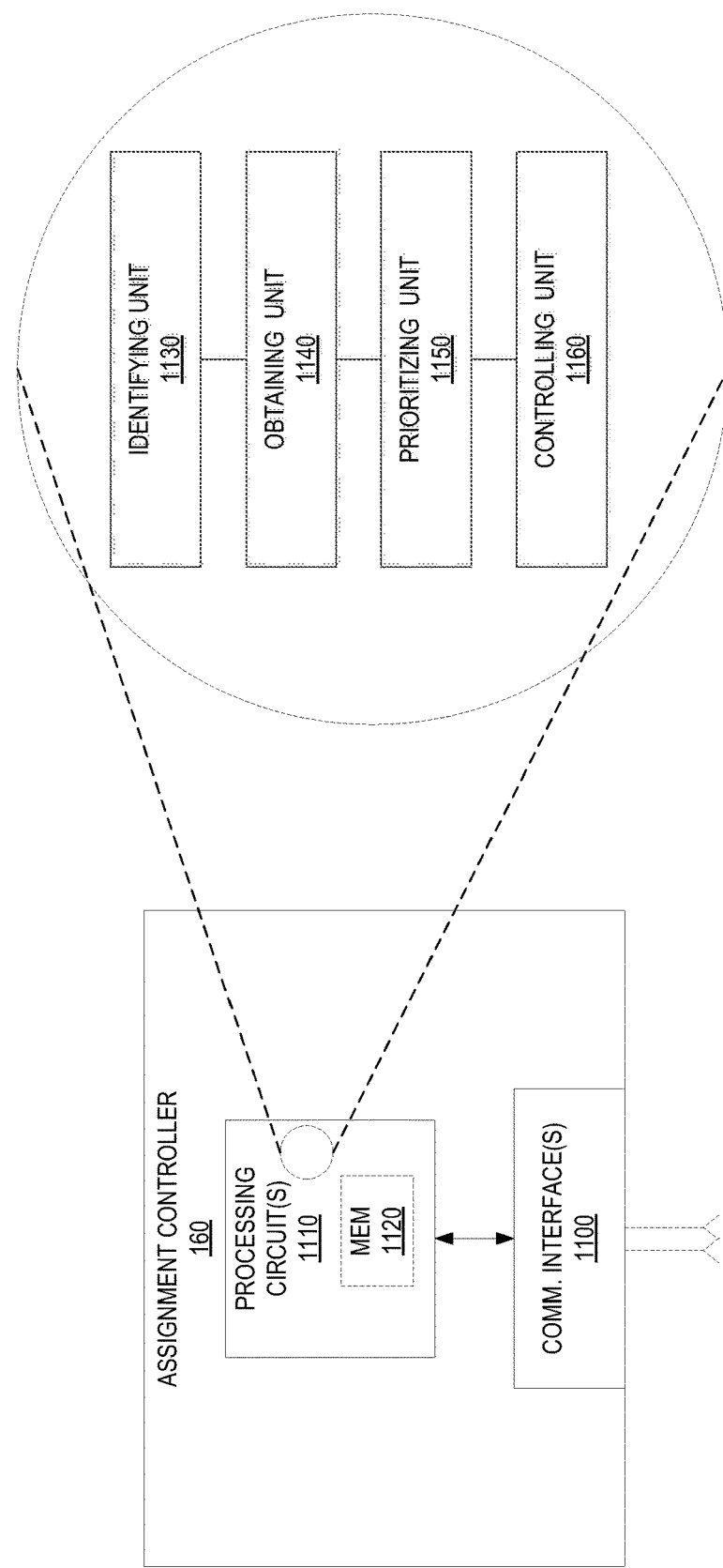
FIG. 8 is a block diagram of an assignment controller according to one or more embodiments.

With the above modifications and variations in mind, FIG. 8 illustrates additional details of the assignment controller 160 according to one or more embodiments. The assignment controller 160 is configured, e.g., via functional means or units 1130-1160, to implement processing 400 for governing the assignment of an IMS control function instance to an IMS endpoint 110. The assignment controller 160 in some embodiments for example includes an identifying means or unit 1130 configured to identify multiple instances $210_1 \ldots 210_A$ of an IMS control function as being candidates for assigning to the IMS endpoint 110. The assignment controller 160 in such a case further includes an obtaining means or unit 1140 configured to obtain a performance metric and an emission metric for each candidate instance $210_1 \ldots 210_A$, as described above with respect to FIG. 2. The controller 160 also includes a prioritizing means or unit 1150 configured to prioritize the candidate instances $210_1 \ldots 210_A$ relative to one another based on the performance and emission metrics of each instance. The assignment controller 160 in this regard more highly prioritizes candidate instances that would yield higher performance and lower emissions. Having prioritized the candidate instances $210_1 \ldots 210_A$ in this way, the controller 160 finally includes a controlling means or unit 1160 configured to control assignment of one of the candidate instances to the IMS endpoint 110 to be performed according to this prioritization.

In at least some embodiments, the assignment controller 160 comprises one or more processing circuits 1110 configured to implement processing 400, such as by implementing functional means or units 1130-1160. In one embodiment, for example, the controller's processing circuit(s) 1110 implement functional means or units 1130-1160 as respective circuits. The circuits in this regard may comprise circuits dedicated to performing certain functional processing and/or one or more microprocessors in conjunction with memory 1120. In embodiments that employ memory 1120, which may comprise one or several types of memory such as read-only memory (ROM), random-access memory, cache memory, flash memory devices, optical storage devices, etc., the memory stores program code that, when executed by the one or more for carrying out one or more microprocessors, carries out the techniques described herein.

In one or more embodiments, the assignment controller 160 also comprises one or more communication interfaces 1100. The one or more communication interfaces 1100 include various components (not shown) for sending and receiving data and control signals. More particularly, the interface(s) 1100 include a transmitter that is configured to use known signal processing techniques, typically according to one or more standards, and is configured to condition a signal for transmission (e.g., over the air via one or more antennas). Similarly, the interface(s) 1100 include a receiver that is configured to convert signals received (e.g., via the antenna(s)) into digital samples for processing by the one or more processing circuits 1110. For example, the controller 160 may include a management interface to receive provisioning information from and to relay back updates to the IMS management system 150, a SIP interface to handshake with or read from a S-CSCF, and/or a Diameter interface to handshake with, read from, or write to an HSS.

Note that the assignment controller 160 in some embodiments is deployed on a single physical host. In other embodiments, though, the assignment controller 160 is distributed over multiple physical hosts, e.g., in geographically distributed IMS networks, such that the one or more processing circuits 1140 are those of the distributed hosts. In this case, the distributed instances of the assignment controller 160 may communicate with one another to realize the techniques described herein in a way that appears centralized from a logical perspective.

Those skilled in the art will also appreciate that embodiments herein further include a corresponding computer program. The computer program comprises instructions which, when executed on at least one processor of an assignment controller 160, cause the controller 160 to carry out any of the processing described above. Embodiments further include a carrier containing such a computer program. This carrier may comprise one of an electronic signal, optical signal, radio signal, or computer readable storage medium.

Figure 9:
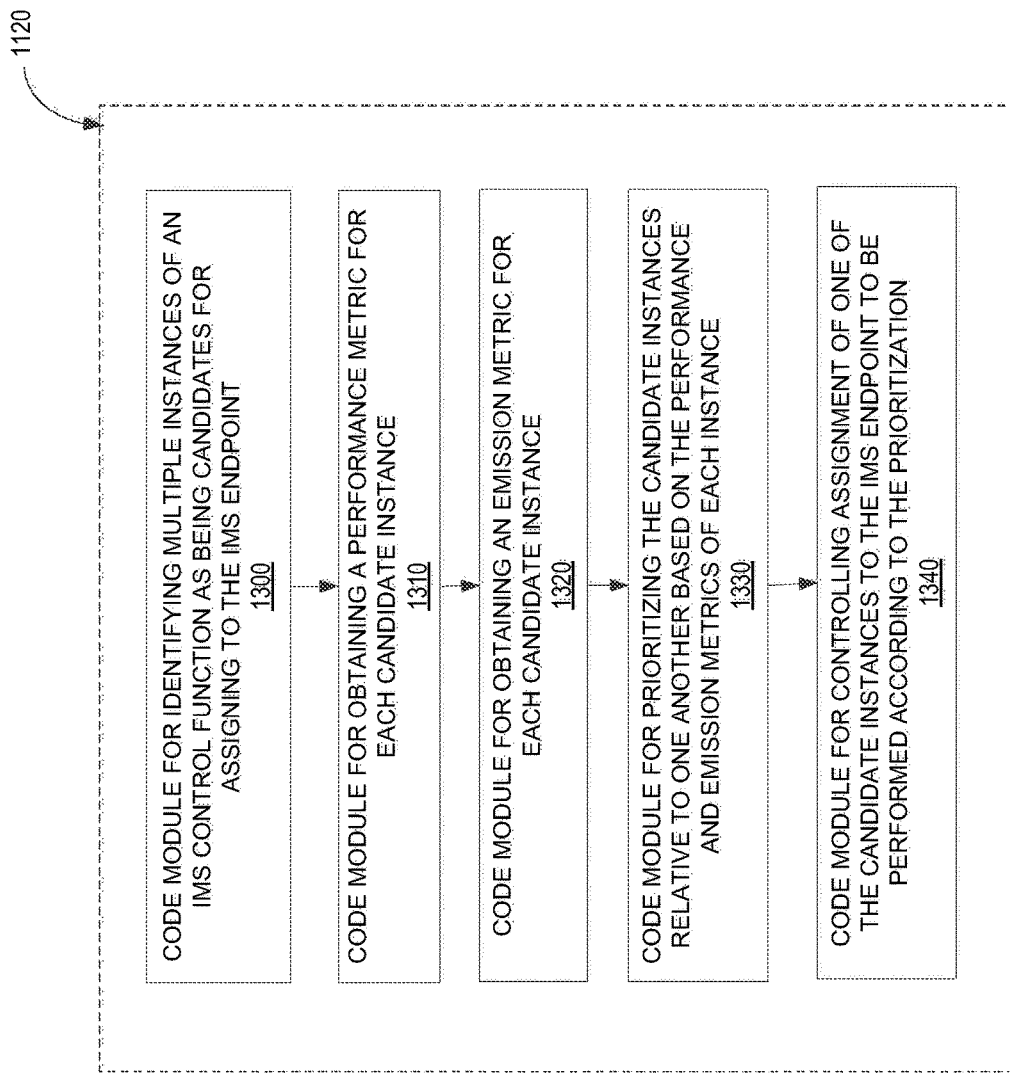
FIG. 9 is a block diagram of code modules for governing the assignment of an IMS control function instance to an IMS endpoint according to one or more embodiments.

FIG. 9 for example illustrates a computer program comprising one or more code modules contained in memory 1120 of the assignment controller 160 in FIG. 8. The code modules include a code module 1300 for identifying multiple instances $210_1 \ldots 210_A$ of an IMS control function as being candidates for assigning to the IMS endpoint 110. The code modules also include a module 1310 for obtaining a performance metric for each candidate instance $210_1 \ldots 210_A$ and a module 1320 for obtaining an emission metric for each candidate instance $210_1 \ldots 210_A$, as described above with respect to FIG. 2. The code modules further include a module 1330 for prioritizing the candidate instances $210_1 \ldots 210_A$ relative to one another based on the performance and emission metrics of each instance. Finally, the code modules include a module 1340 for controlling assignment of one of the candidate instances to the IMS endpoint 110 to be performed according to this prioritization.

Those skilled in the art will further recognize that, although described herein with respect to IMS, embodiments herein are equally applicable in any type of cloud communications platform or other framework for delivering IP multimedia services, even those that do not have a dedicated datagram path.

The present invention may, therefore, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

ABBREVIATIONS

AS Application Server
DHCP Dynamic Host Configuration Protocol
DNS Domain Name Server
FQDN Fully Qualified Domain Name
HSS Home Subscriber Server
IMS Internet Protocol Multimedia Subsystem
I-CSCF Interrogating Call Session Control Function
IP Internet Protocol
MGCF Media Gateway Controller Function
MRFC Media Resource Function Controller
P-CSCF Proxy Call Session Control Function
S-CSCF Serving Call Session Control Function
SIP Session Initiation Protocol

What is claimed is:

1. A method for governing the assignment of an IP Multimedia Subsystem, IMS, control function instance to an IMS endpoint, the method comprising:
   identifying multiple instances of an IMS control function as being candidates for assigning to the IMS endpoint;
   obtaining a performance metric for each candidate instance that is a measure of the extent to which performance requirements for a signaling path of an anticipated or ongoing session of the IMS endpoint would be met if the candidate instance were to be assigned to the IMS endpoint;
   obtaining an emission metric for each candidate instance that is a measure of the extent to which the candidate instance would produce greenhouse gas emissions if the candidate instance were to be assigned to the IMS endpoint, given the energy consumption and rate of greenhouse gas emissions currently attributable to the candidate instance, said consumption and rate being dependent on the type of each energy source currently being used by the candidate instance;
   prioritizing the candidate instances relative to one another based on the performance and emission metrics of each instance, by more highly prioritizing candidate instances that would yield higher performance and lower emissions; and
   controlling assignment of one of the candidate instances to the IMS endpoint to be performed according to said prioritization.

2. The method of claim 1, wherein said controlling comprises manipulating endpoint-specific configuration data that governs said assignment to reflect said prioritization.

3. The method of claim 2, wherein said manipulating comprises manipulating the endpoint-specific configuration data as maintained by at least one of a home subscriber server, HSS, a dynamic host configuration protocol, DHCP, server, a domain name server, DNS, and a policy server.

4. The method of claim 1, wherein the method is performed periodically or occasionally in anticipation of the session.

5. The method of claim 1, wherein at least one of:
   said assignment is performed during a discovery process in which the IMS endpoint attempts to discover the IMS control function, and the method is performed at least in part before said discovery process; or
   said assignment is performed during a registration process in which the IMS endpoint registers with an IMS, and the method is performed at least in part before said registration process.

6. The method of claim 1, wherein the session is an ongoing session, wherein two or more of the candidate instances are virtual instances of the IMS control function in a virtualized IMS, wherein assignment of one of the candidate instances to the IMS endpoint comprises changing the instance assigned to the IMS endpoint from an old virtual instance to a new virtual instance and migrating a state of the old virtual instance to a state of the new virtual instance to preserve service continuity.

7. The method of claim 6, wherein said controlling comprises triggering an IMS management system to perform said assignment according to said prioritization.

8. The method of claim 1, wherein obtaining the emission metric for a candidate instance comprises determining the rate of greenhouse gas emissions currently attributable to the candidate instance in accordance with a defined policy, wherein the policy effectively defines different possible rates attributable to the candidate instance depending on certain conditions, wherein the policy specifies those conditions in terms of at least one of:
- different times of day;
- different locations of the hardware executing the instance;
- different types of one or more energy sources used by the candidate instance;
- different types of media for the session; and
- different durations of the session.

9. The method of claim 1, wherein the performance metric for a candidate instance is, at least in part, a measure of the extent to which signaling delay requirements for the signaling path would be met if the candidate instance were to be assigned to the IMS endpoint, said delay requirements being dependent on a location of the instance relative to the current location of the IMS endpoint.

10. The method of claim 1, further comprising obtaining a billing parameter that indicates whether and/or to what extent the IMS endpoint is subscribed to a service providing said prioritized assignment, and determining whether or to what extent to perform the method based on the billing parameter.

11. The method of claim 1, wherein said prioritizing is further based on historical data indicating which of the candidate instances have actually been assigned to the same or a different IMS endpoint in the past.

12. The method of claim 1, wherein the IMS control function is either a proxy call session control function, P-CSCF, a serving call session control function, S-CSCF, an interrogating proxy session control function, I-CSCF, a media resource function controller, MRFC, or a media gateway controller function, MGCF.

13. The method of claim 1, wherein:
the IMS control function is a first IMS control function;
the method further comprises identifying multiple instances of a second IMS control function as being candidates for assigning to the IMS endpoint in combination with the first IMS control function;
obtaining a performance metric comprises obtaining a performance metric for each combination of candidate instances of the first and second IMS control functions that is a measure of the extent to which performance requirements for the signaling path would be met if the candidate instances were to be assigned to the IMS endpoint in combination;
obtaining an emission metric comprises obtaining an emission metric for each combination of candidate instances of the first and second IMS control functions that is a measure of the extent to which the candidate instances in combination would produce greenhouse gas emissions if the candidate instances were to be assigned to the IMS endpoint in combination, given the energy consumption and rate of greenhouse gas emissions currently attributable to that combination, said consumption and rate being a combination of the respective rates currently attributable to the candidate instances individually;
said prioritizing comprises prioritizing combinations of candidate instances of the first and second IMS control functions relative to one another based on the performance and emission metrics of each combination; and
said controlling comprises controlling assignment of one of the combinations to the IMS endpoint to be performed according to said prioritization.

14. The method of claim 13, wherein the first IMS control function is a serving call session control function, S-CSCF, and the second IMS control function is either a proxy call session control function, P-CSCF, a media resource function controller, MRFC, or a media gateway controller function, MGCF.

15. An assignment controller for governing the assignment of an IP Multimedia Subsystem (IMS) control function instance to an IMS endpoint, the assignment controller comprising:
processing circuitry and memory, the memory containing instructions executable by the processing circuitry whereby the assignment controller is configured to:
identify multiple instances of an IMS control function as being candidates for assigning to the IMS endpoint;
obtain a performance metric for each candidate instance that is a measure of the extent to which performance requirements for a signaling path of an anticipated or ongoing session of the IMS endpoint would be met if the candidate instance were to be assigned to the IMS endpoint;
obtain an emission metric for each candidate instance that is a measure of the extent to which the candidate instance would produce greenhouse gas emissions if the candidate instance were to be assigned to the IMS endpoint, given the energy consumption and rate of greenhouse gas emissions currently attributable to the candidate instance, said consumption and rate being dependent on the type of each energy source currently being used by the candidate instance;
prioritize the candidate instances relative to one another based on the performance and emission metrics of each instance, by more highly prioritizing candidate instances that would yield higher performance and lower emissions; and
control assignment of one of the candidate instances to the IMS endpoint to be performed according to said prioritization.

16. The assignment controller of claim 15, wherein the assignment controller is distributed over multiple IMS domains.

17. The assignment controller of claim 15, wherein the assignment controller comprises:
a management interface configured to receive a provisioning request from an IMS management system for provisioning a service for said prioritized assignment;
a session initiation protocol, SIP, interface configured to communicate with one or more serving call session control functions, S-CSCFs; and
a Diameter interface configured to communicate with a home subscriber server, HSS.

18. The assignment controller of claim 15, the memory containing instructions executable by the processing circuitry whereby the assignment controller is configured to manipulate endpoint-specific configuration data that governs said assignment to reflect said prioritization.

19. The assignment controller of claim 18, the memory containing instructions executable by the processing circuitry whereby the assignment controller is configured to manipulate the endpoint-specific configuration data as maintained by at least one of a home subscriber server, HSS, a dynamic host configuration protocol, DHCP, server, a domain name server, DNS, and a policy server.

20. The assignment controller of claim 15, the memory containing instructions executable by the processing circuitry whereby the assignment controller is configured to perform said identifying, said obtaining of the performance metric, said obtaining of the emission metric, said prioritizing, and said controlling periodically or occasionally in anticipation of the session.

21. The assignment controller of claim 15, wherein at least one of:
    said assignment is performed during a discovery process in which the IMS endpoint attempts to discover the IMS control function, and the assignment controller is configured to perform said identifying, said obtaining of the performance metric, said obtaining of the emission metric, said prioritizing, and said controlling at least in part before said discovery process; or
    said assignment is performed during a registration process in which the IMS endpoint registers with an IMS, and the method is performed at least in part before said registration process.

22. The assignment controller of claim 15, wherein the session is an ongoing session, wherein two or more of the candidate instances are virtual instances of the IMS control function in a virtualized IMS, wherein assignment of one of the candidate instances to the IMS endpoint comprises changing the instance assigned to the IMS endpoint from an old virtual instance to a new virtual instance and migrating a state of the old virtual instance to a state of the new virtual instance to preserve service continuity.

23. The assignment controller of claim 22, the memory containing instructions executable by the processing circuitry whereby the assignment controller is configured to trigger an IMS management system to perform said assignment according to said prioritization.

24. The assignment controller of claim 15, the memory containing instructions executable by the processing circuitry whereby the assignment controller is configured to determine the rate of greenhouse gas emissions currently attributable to the candidate instance in accordance with a defined policy, wherein the policy effectively defines different possible rates attributable to the candidate instance depending on certain conditions, wherein the policy specifies those conditions in terms of at least one of:
    different times of day;
    different locations of the hardware executing the instance;
    different types of one or more energy sources used by the candidate instance;
    different types of media for the session; and
    different durations of the session.

25. The assignment controller of claim 15, wherein the performance metric for a candidate instance is, at least in part, a measure of the extent to which signaling delay requirements for the signaling path would be met if the candidate instance were to be assigned to the IMS endpoint, said delay requirements being dependent on a location of the instance relative to the current location of the IMS endpoint.

26. The assignment controller of claim 15, the memory containing instructions executable by the processing circuitry whereby the assignment controller is configured to obtain a billing parameter that indicates whether and/or to what extent the IMS endpoint is subscribed to a service providing said prioritized assignment, and determine whether or to what extent to perform said identifying, said obtaining of the performance metric, said obtaining of the emission metric, said prioritizing, and said controlling based on the billing parameter.

27. The assignment controller of claim 15, wherein the memory containing instructions executable by the processing circuitry whereby the assignment controller is configured to prioritize the candidate instances further based on historical data indicating which of the candidate instances have actually been assigned to the same or a different IMS endpoint in the past.

28. The assignment controller of claim 15, wherein the IMS control function is either a proxy call session control function, P-CSCF, a serving call session control function, S-CSCF, an interrogating proxy session control function, I-CSCF, a media resource function controller, MRFC, or a media gateway controller function, MGCF.

29. The assignment controller of claim 15, wherein the IMS control function is a first IMS control function, and wherein the memory containing instructions executable by the processing circuitry whereby the assignment controller is configured to:
    identify multiple instances of a second IMS control function as being candidates for assigning to the IMS endpoint in combination with the first IMS control function;
    obtain a performance metric for each combination of candidate instances of the first and second IMS control functions that is a measure of the extent to which performance requirements for the signaling path would be met if the candidate instances were to be assigned to the IMS endpoint in combination;
    obtain an emission metric for each combination of candidate instances of the first and second IMS control functions that is a measure of the extent to which the candidate instances in combination would produce greenhouse gas emissions if the candidate instances were to be assigned to the IMS endpoint in combination, given the energy consumption and rate of greenhouse gas emissions currently attributable to that combination, said consumption and rate being a combination of the respective rates currently attributable to the candidate instances individually;
    prioritize combinations of candidate instances of the first and second IMS control functions relative to one another based on the performance and emission metrics of each combination; and
    control assignment of one of the combinations to the IMS endpoint to be performed according to said prioritization.

30. The assignment controller of claim 15, wherein the first IMS control function is a serving call session control function, S-CSCF, and the second IMS control function is either a proxy call session control function, P-CSCF, a media resource function controller, MRFC, or a media gateway controller function, MGCF.

31. A non-transitory computer-readable storage medium having stored thereon a computer program that, when executed by a processor of an assignment controller, causes the assignment controller to perform a process for governing the assignment of an IP Multimedia Subsystem (IMS) control function instance to an IMS endpoint, wherein the process comprises:
    identifying multiple instances of an IMS control function as being candidates for assigning to the IMS endpoint;
    obtaining a performance metric for each candidate instance that is a measure of the extent to which performance requirements for a signaling path of an anticipated or ongoing session of the IMS endpoint would be met if the candidate instance were to be assigned to the IMS endpoint;
    obtaining an emission metric for each candidate instance that is a measure of the extent to which the candidate instance would produce greenhouse gas emissions if the candidate instance were to be assigned to the IMS endpoint, given the energy consumption and rate of greenhouse gas emissions currently attributable to the candidate instance, said consumption and rate being dependent on the type of each energy source currently being used by the candidate instance;

prioritizing the candidate instances relative to one another based on the performance and emission metrics of each instance, by more highly prioritizing candidate instances that would yield higher performance and lower emissions; and controlling assignment of one of the candidate instances to the IMS endpoint to be performed according to said prioritization.

\* \* \* \* \*